(12) United States Patent
Hsu et al.

(10) Patent No.: US 7,809,340 B2
(45) Date of Patent: *Oct. 5, 2010

(54) APPARATUS FOR IMPLEMENTING ENHANCED HAND SHAKE PROTOCOL IN MICROELECTRONIC COMMUNICATION SYSTEMS

(75) Inventors: Louis Lu-Chen Hsu, Fishkill, NY (US); Jack Allan Mandelman, Flat Rock, NC (US); James Stephen Mason, Eastleigh, NH (US)

(73) Assignee: International Business Machines Corporation, Armonk, NY (US)

( * ) Notice: Subject to any disclaimer, the term of this patent is extended or adjusted under 35 U.S.C. 154(b) by 99 days.

This patent is subject to a terminal disclaimer.

(21) Appl. No.: 12/127,159

(22) Filed: May 27, 2008

(65) Prior Publication Data

US 2008/0227425 A1    Sep. 18, 2008

Related U.S. Application Data

(63) Continuation of application No. 11/282,090, filed on Nov. 17, 2005, now Pat. No. 7,412,211.

(51) Int. Cl.
*H04B 1/04* (2006.01)

(52) U.S. Cl. .................................................. 455/127.1
(58) Field of Classification Search .............. 455/67.11, 455/67.14, 91, 115.1, 115.2, 127.1, 127.2, 455/127.5, 226.1; 375/218, 219, 222, 224
See application file for complete search history.

(56) References Cited

U.S. PATENT DOCUMENTS

| 2005/0190828 A1 | 9/2005 | Hsu et al. |
| 2006/0105725 A1 | 5/2006 | Cheung et al. |

*Primary Examiner*—Thanh C Le
(74) *Attorney, Agent, or Firm*—Joan Pennington; James R. Nock

(57) ABSTRACT

An apparatus is provided for implementing an enhanced hand shake protocol for microelectronic communication systems. A transmitter and a receiver is coupled together by a transmission link. The transmitter receives an idle input. The idle input is activated when the transmitter is not transmitting data and the transmitter applies a first common 10 mode level to the receiving unit. The idle input is deactivated when the transmitter is ready to transmit data and the transmitter raises the common mode level to the receiving unit. Responsive to the receiver detecting the common mode level up-movement, then the receiver receives the transmitted data signals. After the desired data has been sent, the 15 transmitter terminates communications, drops the common mode level with the idle input being activated.

7 Claims, 7 Drawing Sheets

DC MODE (1)

PRIOR ART

APPARATUS FOR IMPLEMENTING ENHANCED HAND SHAKE PROTOCOL IN MICROELECTRONIC COMMUNICATION SYSTEMS

FIELD OF THE INVENTION

This application is a continuation application of Ser. No. 11/282,090 filed on Nov. 17, 2005, now U.S. Pat. No. 7,412,211 issued Aug. 12, 2008.

DESCRIPTION OF THE RELATED ART

In prior art microelectronic systems, communications between two units is established through hand-shake protocols. For example, for data to be transmitted from the first unit to a remote second unit, and vice versa, a receiver and transmitter are needed for each unit. For low-power applications, it is necessary to detect the presence and absence of the signals transmitted from a remote unit so that when no signal is present the unit can be in a low-power mode.

A signal detector is thus needed to always be on duty to wake-up the receiving unit when the incoming signal arrives. Such signal detector serves as the hand-shake device. To wake up the receiving unit, the transmitting unit typically sends out a specific signal pattern. Upon receiving such pattern, the receiving unit typically acknowledges that it has successfully received the signal and that it is ready to receive the real data signals.

Further a wire detector is also needed for detecting whether the wire connection is in good condition. The Joint Test Action Group (JTAG) has agreed upon an IEEE standard 1149.6 to provide specifications for wire testing. While the previously discussed signal detector detects differential signals at speed, the wire detector need only be able to detect single wire connectivity. A pair of wire detectors is required, one for each differential pair of wires. Additionally, since the wire detector need only detect the connectivity of the wire, and does not need to sense the incoming signals at speed, signal levels during wire testing is not a concern.

A wire detector is much easier to design than a signal detector, since the signal detector must provide an absolute signal threshold for signal comparison. However, since the signal detector cannot perform the wire testing task, and vice versa, the resulting receiver system needs to have a hand shake protocol comprising a pair of wire detectors and a signal detector.

Drawbacks of using a conventional pair of wire detectors and a conventional signal detector are (1) more silicon area in the prime real estate are needed which causes congestion in the critical signal path; (2) typically the signal detector consumes about ten times more power than a wire detector, such as 3 mW versus 0.3 mW; and (3) it is challenging or impossible to provide one design for a signal detector that must serve a spectrum of applications with different specifications.

FIG. 1 shows a commonly used arrangement for detecting the presence and absence of differential signals. Data (D_IN) sent from the transmitter (TX) is traveling along the channel and received by the receiver (RX) at the other end. The received data (D_OUT) then is sensed by the signal detector (SigDet). The output X of SigDet is high when valid data has been received, and low when no valid data is received. The non-valid data could be caused by noise such as cross talk from adjacent links, power or substrate coupling noise. The signal detector is difficult to design, since the designated signal window can be very small. For example, the InfiniBand specification defines that a peak-to-peak differential signal of 185 mV and above is a valid signal, and 87 mV and below is invalid. Anything in between these values is undefined, meaning that the SigDet output "X" can be either high or low.

A key challenge for designing a robust SigDet is to control the threshold tolerance where the tighter the threshold tolerance the better. This tolerance usually depends on process, temperature and voltage variations. More specifically, fluctuations in reference current levels due to temperature, resistor dimension mistracking, device threshold voltage, and the like all add to the total tolerance and eventually can cause the undetermined zone to exceed the target. While it is possible to provide an effective signal-to-reference tracking technique to achieve a good signal detector SigDet design, however, such SigDet design is achieved at a cost of higher power and more silicon area.

For example, U.S. Pat. No. 6,879,712 issued to Westerfield J. Ficken, Louis L. Hsu, James S. Mason, and Phil J. Murfet on May 24, 2005, and assigned to the present assignee, discloses apparatus and method for detecting loss of differential signal carried by a pair of differential signal lines. According to the method, a common mode level is detected from voltages on the pair of differential signal lines. A threshold level is generated, referenced to the detected common mode level. A signal level is generated from the voltages on the pair of differential signal lines, the signal level being averaged over a first period of time. From the threshold level and the detected common mode level a reference level is generated, the reference level being averaged over a second period of time longer than then the first period of time. The signal level is compared to the reference level to determine if a signal is present on the pair of differential signal lines.

In FIG. 2 a JTAG wire detector is illustrated for detecting single wire connectivity. Here a pair of sensors CD_0 and CD_1 is prepared to detect single wire connectivity. Connectivity is checked using AC and DC coupling modes. Here, for simplicity only DC coupling is shown. For AC coupling, one must check for shorted coupling capacitors. Briefly, the JTAG wire detector creates a self-reference to check the incoming signal when it is in the AC mode, and uses a fixed DC level as the reference during the DC mode. The JTAG wire detector can detect signals at very low frequency, almost at the DC level. For example, during wire testing mode, incoming signals (D_IN) from TX will have one wire held high and the other low, and the output Y0 and Y1 will read 1 and 0, respectively. Then, the signal polarity is flipped, and the reversed signals should be detected. The JTAG wire detector design is well known in the art. It cannot detect high-speed signals, but consumes much less power than the signal detector SigDet of FIG. 1.

In FIG. 3 another type of up-channel communication devices are shown. In this design test data is transmitted from the RX side to the TX side for testing and calibration purposes. Two approaches have been proposed, the first one is called time-sharing data transfer. That is, test data is transferred during a different time period than the normal data transfer. In this case, when sending test data up-stream via the wires, normal operation is on hold, and vice versa. The second approach transfers test data and normal data simultaneously via the same wires but using different frequency. For example, one can modulate the common mode level to deliver the low-frequency test data, while maintaining the normal high-frequency data transmission. Notice that, the up-channel operation is mainly used to send test data from RX to TX and has never been used for other purposes.

SUMMARY OF THE INVENTION

Principal aspects of the present invention are to provide a method and apparatus for implementing an enhanced hand shake protocol for microelectronic communication systems. Other important aspects of the present invention are to provide such method and apparatus for implementing an enhanced hand shake protocol for microelectronic communication systems substantially without negative effect and that overcome some of the disadvantages of prior art arrangements.

In brief, a method and apparatus are provided for implementing an enhanced hand shake protocol for microelectronic communication systems. A transmitter and a receiver is coupled together by a transmission link. The transmitter receives an idle input. The idle input is activated when the transmitter is not transmitting data and the transmitter applies a first common mode level to the receiving unit. The idle input is deactivated when the transmitter is ready to transmit data and the transmitter raises the common mode level to the receiving unit. Responsive to the receiver detecting the common mode level up-movement, then the receiver receives the transmitted data signals. After the desired data has been sent, the transmitter terminates communications, drops the common mode level with the idle input being activated.

In accordance with features of the invention, the receiver receives a signal detect input. When in the wire test mode, the signal detect input is deactivated and a DC threshold is set at its normal level for low-frequency wire connectivity testing. During normal operating mode, the signal detect input is asserted to shift the DC threshold level lower to a predetermined level for signal detection.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In accordance with features of the preferred embodiments, a relatively simple and effective hand shake apparatus is provided for detecting the presence and absence of signals during normal operating mode, and for detecting wire connectivity during the wire testing mode. Instead of sending out a wake-up signal pattern, the transmitting unit raises a common mode level to the receiving unit. Upon detecting the common mode up-movement, the receiver wakes up and initializes to receive the real data signals. After the desired data has been sent, the transmitting unit terminates communications by dropping the common mode level, thus eliminating any possibility of illegal communications caused by noise coupling.

In accordance with features of the preferred embodiments, a new hand shake protocol with a combined signal and wire detector is provided. The hand shake protocol can be used to detect wire connectivity during JTAG test mode and satisfies the IEEE JTAG specifications 1149.1 and 1149.6. The hand shake protocol can also be used to sense valid signals during normal operating mode.

In accordance with features of the preferred embodiments, advantages of this combined detector are summarized as: (1) smaller area required in the prime chip real estate region; (2) less loading to the critical I/O path; (3) very effective and robust in operation; and (4) lower power consumption than prior art techniques.

Figure 1:
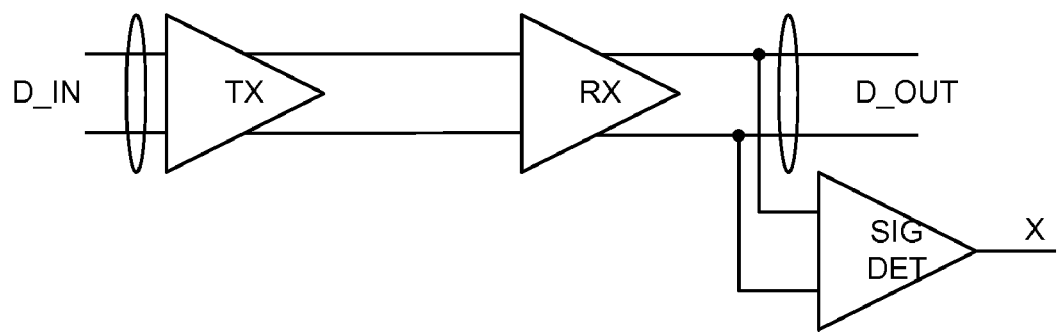
FIGS. 1-3 respectively illustrate prior art microelectronic communication arrangements for detecting the presence and absence of differential signals, a JTAG wire detector, and up-channel communication devices.
Figure 2:
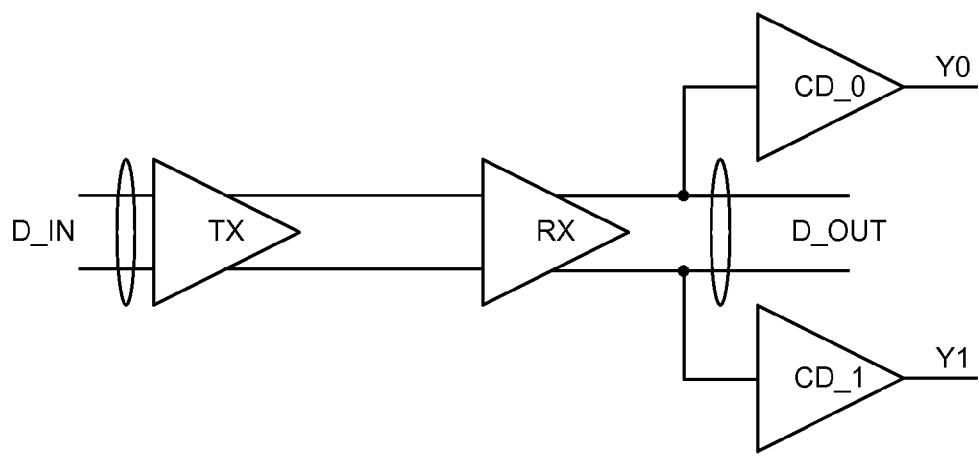
Figure 3:
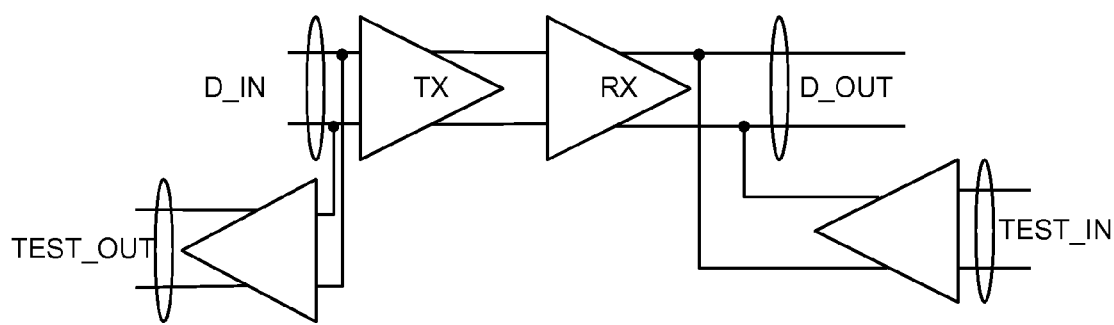
Figure 4:
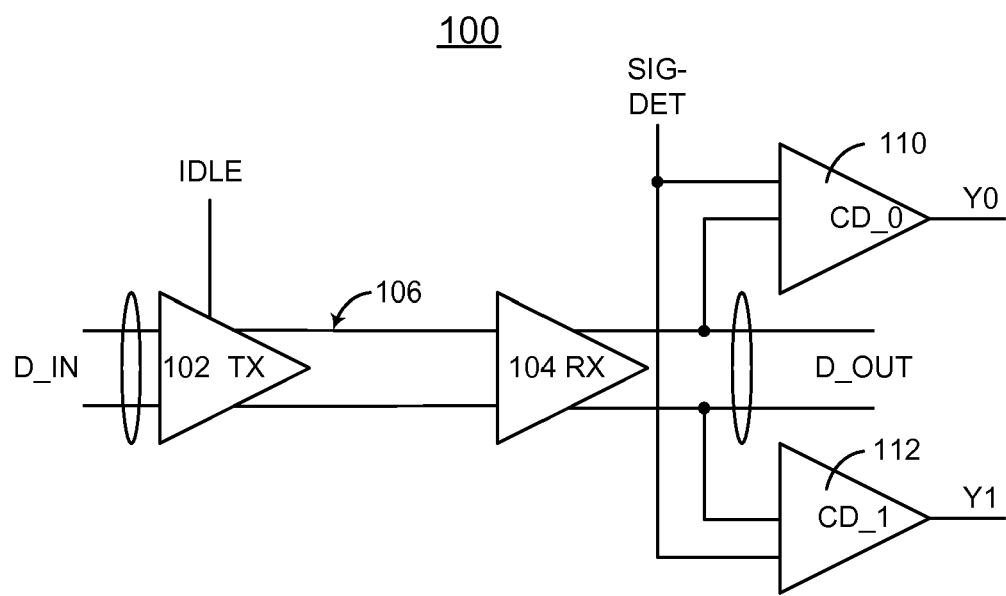
FIG. 4 illustrates apparatus for implementing an enhanced hand shake protocol for microelectronic communication systems in accordance with the preferred embodiment.

Having reference now to the drawings, in FIG. 4, there is shown apparatus for implementing an enhanced hand shake protocol for microelectronic communication systems generally designated by the reference character 100 in accordance with the preferred embodiment. Hand shake protocol apparatus 100 is arranged for detecting the presence and absence of signals during normal operating mode, and for detecting wire connectivity during the wire testing mode. Hand shake protocol apparatus 100 is shown in simplified form sufficient for understanding of the present invention.

Hand shake protocol apparatus 100 includes a transmitter (TX) 102 coupled to a receiver (RX) 104 via a transmission link 106. An idle mode control pin IDLE is coupled to the transmitter TX 102. When transmitter TX 102 is not transmitting data, the IDLE pin is asserted, or IDLE=1, which shifts the common mode level of the transmitter TX to a predetermined lower level. When transmitter TX 102 is ready to transmit data, the IDLE pin is deactivated, or IDLE=0, to shift the common mode level of the transmitter TX back to normal.

A pair of JTAG receivers 110, 112 is designed to perform two functions: (1) during the wire detection mode, the receiver detects the connectivity of the wire at this moment SIG-DET is set=0 and (2) during the signal detection mode the receiver detects the presence and absence of the signals at this moment SIG-DET=0. The JTAG receivers 110, 112 are attached to a normal receiver RX 104.

Signal detecting advantageously is achieved by the cooperation between transmitter TX 102 and receiver RX 104. The transmitter TX 102 must put itself into the idle mode first when it is not sending signals. The action of dropping the common mode level at the TX side is detected by the wire detector sensors 110, 112 at the RX side for both AC and DC coupling modes.

A SIG-DET control pin is provided to the JTAG wire detector sensors 110, 112. When in the wire test mode, the SIG-DET pin is deactivated (or SIG-DET=0), so that the DC threshold is set at its normal level for low-frequency wire connectivity testing. However, during normal operating mode, the SIG-DET pin is asserted (or SIG-DET=1) to shift the DC threshold level lower to a predetermined level for signal detection.

Figure 5:
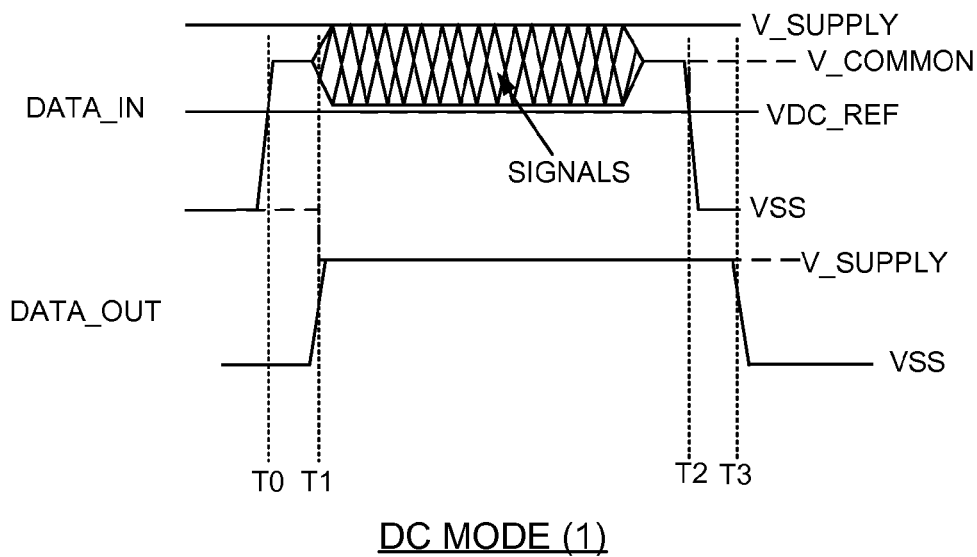
FIGS. 5, 6, and 7 respectively illustrate a first DC coupling mode, a second DC coupling mode with a common mode low level at 0.5 Vsupply, and an AC operating mode of the apparatus of FIG. 4 for implementing an enhanced hand shake protocol in accordance with the preferred embodiment.
Figure 6:
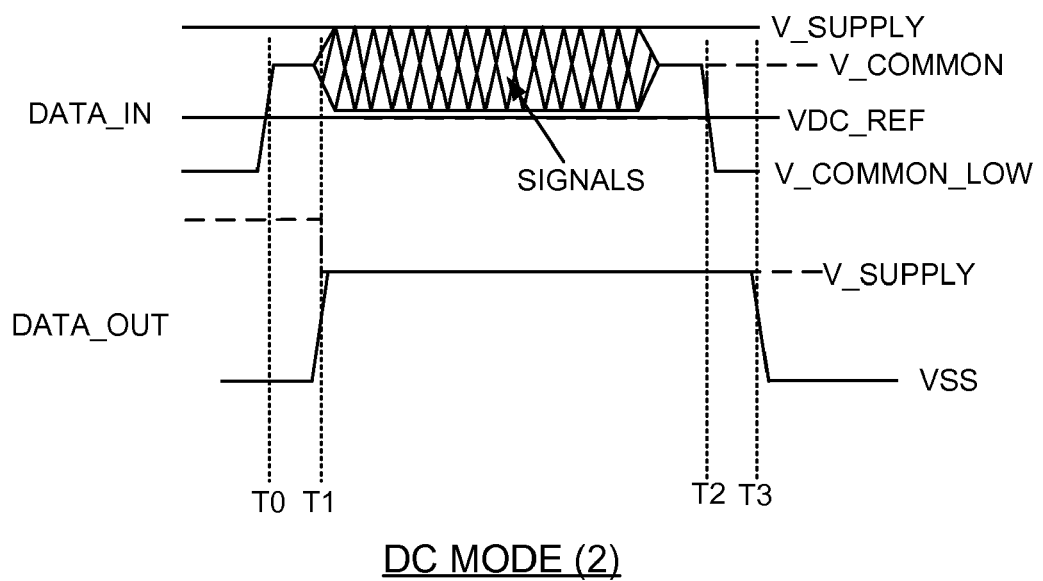
Figure 7:
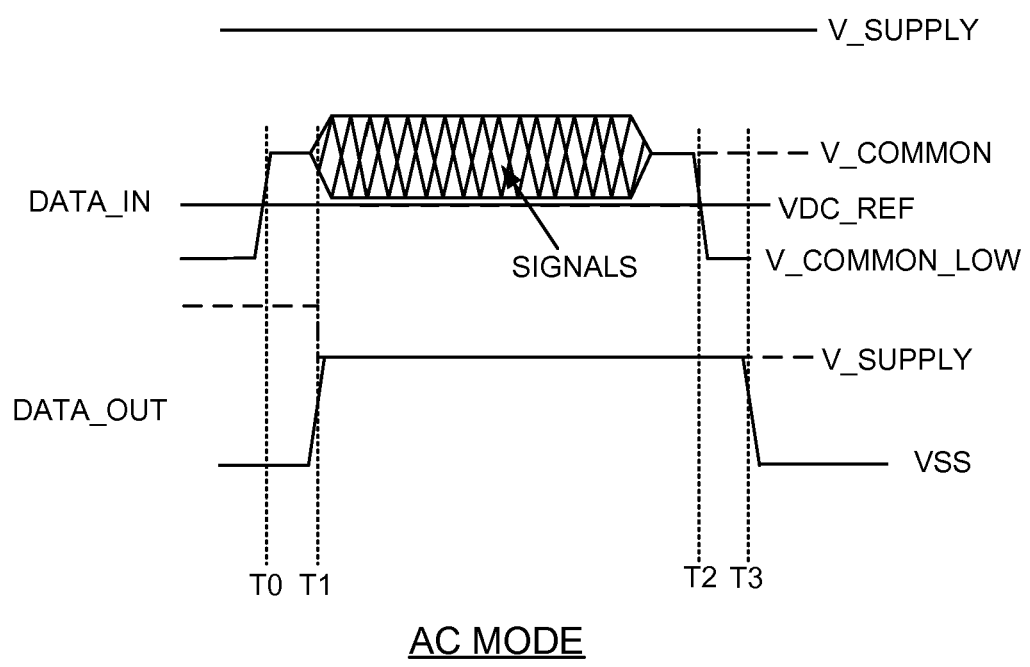

Referring to FIGS. 5, 6, and 7, there are shown simulation results verifying operation of the apparatus 100. For example, the illustrated simulation results are generated using an IBM Power-Spice simulation tool.

In FIG. 5, the results of a first DC coupling mode are shown. The DC reference (or VDC_REF) is set at the JTAG wire detector to be at about 100 mV below the V_SUPPLY to guarantee switching. The valid DC signals have a common mode level (V_COMMON) of about V_SUPPY—½ of signal swing. Before transmitting data, the common mode level at the TX side is switched from ground or VSS. After data transmission is complete, the TX will be at its idle mode again. At that time, the common mode level is switched back to ground. The outputs of the wire detectors reflect the valid signal period with a latency, or delay from T0 to T1 for on and T2 to T3 for off). The latency is in the range, for example, of 10 ns to 30 ns.

In FIG. 6, the results of a second DC coupling mode are shown. It may be desirable to switch the common mode low level of the TX to a preferred value as shown in FIG. 6. Here, the common mode low level is 0.5*V_SUPPLY. As long as this level is sufficiently lower than the reference level, the JTAG wire detector is able to pick up the signal.

In the AC operating mode, the reference level at the JTAG wire detector is self-generated. As shown in FIG. 7, the signal that is coupled to the RX end has a common mode level, which is preset to about 80% of the V_SUPPLY. When signals are absent, the common mode level is dropped to a V_COMMON_LOW level, which causes the JTAG wire detector to un-detect the signal. The output of the wire detector will fall from V_SUPPLY to VSS. In other words, it has sufficient margin to cause the JTAG wire detector to switch properly in both DC and AC coupling modes. When valid signals are not present, the noise presented at the signal line will not be picked up by the JTAG wire detector. This is because each receiver 110 and 112 has a built-in hysteresis buffer to filter out the noise. There is a latency to detect, delay, from T0 to T1 and un-detect delay T2 to T3, the signal, which is in the range of 10 to 30 ns and is acceptable for any existing system. Again in this case, the common mode is coupled from the transmitter end to the receiver end via the AC coupling capacitor. The common mode low level can be set arbitrarily to be suitable for the system. The common mode low level can range from VSS to 0.5*V_SUPPLY.

While the present invention has been described with reference to the details of the embodiments of the invention shown in the drawing, these details are not intended to limit the scope of the invention as claimed in the appended claims.

What is claimed is:

1. Apparatus for implementing an enhanced hand shake protocol for a microelectronic communication system comprising:

a transmitter and a receiver coupled together by a transmission link;

an idle input applied to the transmitter; said transmitter applying a first common mode level to said receiver, responsive to said idle input being activated when the transmitter is not transmitting data;

said transmitter raising said common mode level to said receiver, responsive to said idle input being deactivated when said transmitter is ready to transmit data;

said receiver receiving transmitted data signals, responsive to detecting the common mode level up-movement; and said transmitter dropping said common mode level to said first common mode level applied to said receiver with the idle input being activated, responsive to said transmitter terminating communications.

2. Apparatus for implementing an enhanced hand shake protocol as recited in claim 1 wherein said receiver responsive to detecting the common mode level up-movement wakes up and initializes, then receives the transmitted data signals.

3. Apparatus for implementing an enhanced hand shake protocol as recited in claim 1 wherein said receiver includes a receiver wire detector including a pair of sensors for detecting single wire connectivity.

4. Apparatus for implementing an enhanced hand shake protocol as recited in claim 3 includes a signal detect input applied to said receiver sensors.

5. Apparatus for implementing an enhanced hand shake protocol as recited in claim 4 includes a wire test mode and wherein said signal detect input is deactivated and a DC threshold normal level is set for low-frequency wire connectivity testing.

6. Apparatus for implementing an enhanced hand shake protocol as recited in claim 5 wherein said DC threshold normal level is self-generated by said receiver wire detector of said receiver.

7. Apparatus for implementing an enhanced hand shake protocol as recited in claim 5 wherein said signal detect input is asserted and said DC threshold is shifted to a predetermined lower level for signal detection during a normal operating mode.

* * * * *